United States Patent
Nicolaidis

(10) Patent No.: US 7,380,165 B2
(45) Date of Patent: May 27, 2008

(54) ASSEMBLY OF ELECTRONIC CIRCUITS COMPRISING MEANS FOR DECONTAMINATING ERROR-CONTAMINATED PARTS

(75) Inventor: Michel Nicolaidis, Saint Egreve (FR)

(73) Assignee: IROC Technologies, Grenoble (FR)

( * ) Notice: Subject to any disclaimer, the term of this patent is extended or adjusted under 35 U.S.C. 154(b) by 921 days.

(21) Appl. No.: 10/485,700

(22) PCT Filed: Aug. 2, 2002

(86) PCT No.: PCT/FR02/02788
§ 371 (c)(1),
(2), (4) Date: Feb. 3, 2004

(87) PCT Pub. No.: WO03/015282
PCT Pub. Date: Feb. 20, 2003

(65) Prior Publication Data
US 2004/0219739 A1 Nov. 4, 2004

(30) Foreign Application Priority Data
Aug. 10, 2001 (FR) .................................. 01 10734

(51) Int. Cl.
G06F 11/00 (2006.01)
H04L 1/00 (2006.01)
(52) U.S. Cl. .................... 714/15; 714/47; 714/747
(58) Field of Classification Search .................. 714/15, 714/47, 747
See application file for complete search history.

(56) References Cited

U.S. PATENT DOCUMENTS 4,164,017 A * 8/1979 Randell et al. ............... 714/15
4,562,538 A * 12/1985 Berenbaum et al. .......... 714/15
4,945,510 A * 7/1990 Maeda et al. ................. 714/15
5,119,483 A * 6/1992 Madden et al. ............... 714/15
5,875,346 A 2/1999 Luick
7,159,152 B2 * 1/2007 Von Wendorff .............. 714/47

OTHER PUBLICATIONS

Roberts, "A fault-tolerant scheme that copes with intermittent and transient faults in sequential circuits", Proceedings of the Midwest Symposium on Circuits and Systems, Champaign, Aug. 14-16, 1989, New York, IEEE, US vol. 1, pp. 37-39.

* cited by examiner

*Primary Examiner*—Joseph D. Torres
(74) *Attorney, Agent, or Firm*—Oliff & Berridge, PLC

(57) ABSTRACT

The assembly comprises a circuit for detecting errors in data supplied by at least one of the blocks of the assembly. When an error has been detected, the assembly is decontaminated by one circuit for backup and reconstitution of past states of a latch associated to a block. The backup and reconstitution circuit comprises a multiplexer and buffer register. The multiplexer comprises a first input directly connected to the output of the latch and a second input connected to this output via the buffer register. A control circuit controls the buffer register and the multiplexer so as to activate the buffer register writing function and connect the output of the multiplexer to its first input at each cycle, during a normal operation phase, and to read enable the buffer register and connect the multiplexer output to its second input during predetermined cycles of a decontamination phase.

17 Claims, 2 Drawing Sheets

ASSEMBLY OF ELECTRONIC CIRCUITS COMPRISING MEANS FOR DECONTAMINATING ERROR-CONTAMINATED PARTS

BACKGROUND OF THE INVENTION

The invention relates to an assembly of electronic circuits comprising a plurality of blocks connected to one another, means for detecting errors in the data supplied by at least one of the blocks, and decontamination means.

STATE OF THE ART

Electronic systems are becoming increasingly sensitive to hazards due to their miniaturisation and are more and more liable to produce errors. Incorporating failure tolerance mechanisms is becoming indispensable.

In certain cases, it is aimed to prevent errors originating from certain specific and well defined parts whereas, in other cases, it is aimed to prevent errors originating from any part of the system.

To prevent errors due to transient faults, an error detection mechanism can be used and, if an error is detected, the operations can be resumed from a carefully stored past state of the system. In the existing art these resumptions are performed from the global state of the system, which has been stored at fairly large time intervals using software procedures. Large quantities of information representing the global state of the system then have to be stored. This store operation has the advantage of not requiring a special design of the different parts of the system, in particular of a processor, but requires large hardware resources, in particular as far as memory is concerned. Furthermore, the store procedure is long and consequently cannot be performed very frequently, as it affects the computing capacities of the system to a great extent. Thus, more often than not, a resumption is made from a long-past state and its duration is all the greater. Finally, this technique requires the development of particular software in order to manage this procedure. It therefore involves a recurrent development cost each time a new system is constructed.

OBJECT OF THE INVENTION

The object of the invention is to reduce the cost of storing in an assembly of electronic circuits.

According to the invention, this object is achieved by the fact that the decontamination means comprise at least one circuit for backup and reconstitution of the past states of a latch associated to a block of the assembly, the backup and reconstitution circuit comprising a multiplexer and a buffer register of the first-in first-out type, the multiplexer comprising a first input connected directly to the output of the latch and a second input connected to said output by means of said buffer register.

According to a development of the invention, the assembly comprises control means to control the buffer register and the multiplexer during a normal operating phase and during a decontamination phase, following detection of an error, so as to:
activate the buffer register writing function during predetermined backup cycles during the normal operating phase,
connect the output of the multiplexer to its first input at each cycle during the normal operating phase, and
activate the buffer register reading function and connect the output of the multiplexer to its second input during predetermined cycles of the decontamination phase.

BRIEF DESCRIPTION OF THE DRAWINGS

Other advantages and features will become more clearly apparent from the following description of particular embodiments of the invention, given as non-restrictive examples only and represented in the accompanying drawings, in which.

DESCRIPTION OF PARTICULAR EMBODIMENTS

An electronic assembly to which the invention can be applied comprises a plurality of blocks connected to one another. A block is generally formed by a logic circuit, a latch or a memory. A latch is associated to each block.

Figure 1:
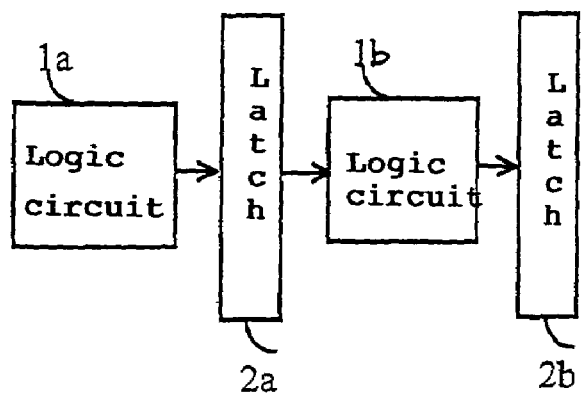
FIG. 1 represents a part of an assembly of circuits in which the invention can be used.

FIG. 1 schematically illustrates a part of an assembly of circuits in which the invention can be implemented. In the embodiment represented, a first logic circuit $1a$ is serially connected with a first latch $2a$ (associated to logic circuit $1a$), a second logic circuit $1b$ and a second latch $2b$ (associated to logic circuit $1b$). In normal operation, data propagation in the assembly is performed during successive cycles (clock cycles or, more generally, operating cycles).

At a given time, a block of the assembly produces an error that is propagated in the assembly during q operating cycles before the error is detected and a decontamination procedure initiated. In a general manner, an error due to a transient fault, occurring at a cycle n°0, can propagate at most during the following q cycles until the time it has been detected and a decontamination phase engaged. This error is therefore present during q+1 operating cycles. A decontamination phase has to enable resumption to be performed from a cycle preceding cycle n°0 in order to correct the error introduced during this cycle.

In each assembly, when the blocks liable to produce an error on their output are well identified, it is possible to determined which blocks of the assembly are liable to be affected by this error. Let d be the distance between two components of the assembly corresponding to the number of cycles necessary for a data originating from one of the components to be taken into account, either directly or indirectly, by the other component. In an assembly, only the latches associated to the potentially error generating blocks and the successor latches located at a distance smaller than or equal to q can be affected by the error. Moreover, the closer one of these latches is to a block liable to produce an error, the sooner it will be affected by the error. Thus, the smallest distance dmin separating a latch from the blocks liable to produce an error and predecessors of the latch will determine the first cycle (cycle n° dmin) during which the latch will be affected by the error.

A particular case in which only certain predefined blocks can be considered as being a potential source of error is the case of an assembly in which the designer considers that only the memory blocks are sensitive to transient faults and are liable to produce errors.

According to a first aspect of the invention, local resumption resources designed to backup local and recent states are associated to different parts of the assembly. After initiation of the decontamination procedure, the assembly uses circuits for backup and reconstitution of the past states of certain blocks to decontaminate the assembly and reconstitute its correct state. The backup and reconstitution circuits must enable backup of a number k of states, with $k \geq q+1$ in the general case.

Figure 2:
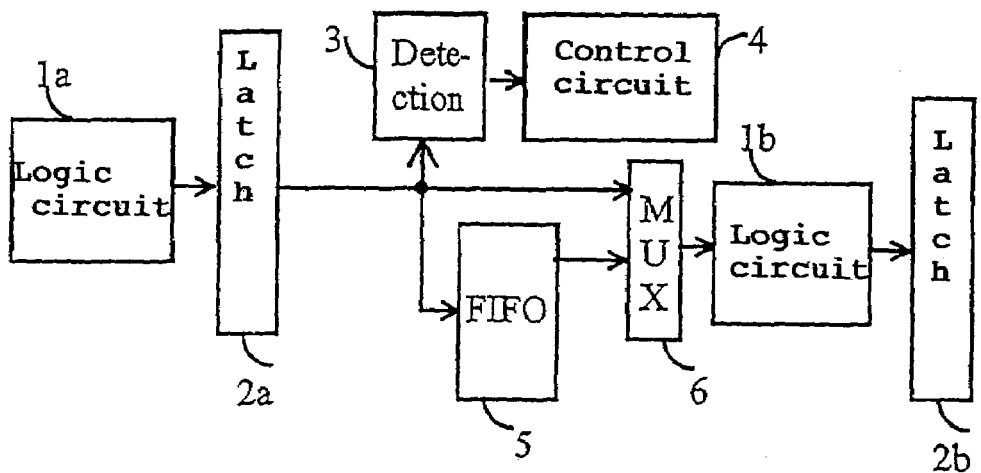
FIG. 2 represents a particular embodiment of the invention for an assembly of circuits of the type represented in FIG. 1.

In FIG. 2, the output of latch 2a is connected to the input of an error detection circuit 3 whose output is connected to the input of a control circuit 4. Detection of an error by the detection circuit causes, via control circuit 4, the beginning of a decontamination phase intended to decontaminate the parts of the assembly contaminated by the error.

In FIG. 2, a circuit for backup and reconstitution of the past states is associated to latch 2a. This backup and reconstitution circuit comprises a buffer register 5 of the first in, first out type designated by the usual abbreviation FIFO and comprising r stages. In the case where r=1, buffer register 5 is then formed by a single latch. The input of buffer register 5 is connected to the output of the associated latch 2a. The backup and reconstitution circuit also comprises a multiplexer 6 comprising a first input connected directly to the output of the associated latch 2a and a second input connected to said output by means of buffer register 5. The multiplexer output is connected to the input of all the blocks to which the output of the associated latch 2a should be connected if there was no backup and reconstitution circuit, i.e. in FIG. 2 to the input of logic circuit 1b.

During a normal operating phase, the writing function of buffer register 5 is activated at each cycle. At each moment, it thus saves the states of the last r past cycles of the associated latch 2a. The output of the multiplexer is then connected to its first input, i.e. to the output of the associated latch 2a.

During the decontamination phase, the backup and reconstitution circuit must be able to selectively supply certain of the r past states it has saved. The reading function of buffer register 5 is then activated during selected cycles of the decontamination phase, the number of cycles of the decontamination phase being able to be greater than r. In the decontamination phase, the output of multiplexer 6 is connected to its second input, i.e. to the output of buffer register 5 during the selected cycles of the decontamination phase. During the rest of the cycles of the decontamination phase, the output of the multiplexer is connected to its first input, i.e. to the output of the corresponding latch.

For each error originating from a given block, the latches associated to a backup and reconstitution circuit can be divided into two groups:
  a first group of latches B1 that are liable to be affected by the error.
  a second group of latches B2 that are not liable to be affected by the error. This second group can itself be divided into two sub-groups, a first sub-group of latches $B2_1$ that are not held during certain cycles of the decontamination phase and a second sub-group of latches $B2_2$ that are held throughout the decontamination phase.

In a general manner, in an assembly where only certain blocks are liable to produce errors, the latches not liable to be affected by an error are considered as latches of the second sub-group of latches $B2_2$ and are held (or disabled) throughout the decontamination phase to preserve their last correct state. Nevertheless, to reduce the cost of the backup and reconstitution circuits, it may be desirable, during the decontamination phase, not to continuously hold certain latches not liable to be affected by the error. These latches, belonging to the first sub-group of latches $B2_1$, can then evolve and supply certain of their past states useful for recovering the correct state of the contaminated latches. For the latches of this first sub-group, the decontamination procedure must be designed so that they recover the last state from which they are made to evolve.

The choice of the selected cycles of the decontamination phase will be made in a different manner depending on whether the latch involved is a B1, a $B2_1$ or a $B2_2$ latch.

In the case of a latch belonging to sub-group $B2_2$, i.e. that is not liable to be affected by the error and is held by control circuit 4 throughout the decontamination phase, all the cycles of the decontamination phase are hold cycles during which the output of multiplexer 6 is connected to its second input, i.e. to the output of buffer register 5. This is necessary for, as latch 2a is in a hold state, it cannot supply the required data. Moreover, all the data contained in buffer register 5 are correct as it has saved the states of a latch not liable to be affected by the error. If a buffer register having a size greater than the size necessary to perform decontamination is used, this buffer register can be enabled during the cycles where the data it supplies are not used. During these cycles, the multiplexer output is then connected to its first input, i.e. to the output of the corresponding latch.

In the case of a latch belonging to sub-group $B2_1$, i.e. that is not liable to be affected by the error but that is held by control circuit 4 only during certain cycles of the decontamination phase, the output of multiplexer 6 is connected to its second input, i.e. to the output of buffer register 5, from the first cycle of the decontamination phase during which the reading function of buffer register is activated until the unhold (or re-enabled) cycle of the latch 2a involved. After the latch has been re-enabled, the multiplexer output can then be connected indiscriminately either to its first or to its second input, i.e. either to the output of latch 2a or to the output of buffer register 5. As latch 2a is no longer held, it in fact supplies correct data from correct data supplied to it by predecessor stages (not represented). Moreover, buffer register 5, which has saved the states of a latch not affected by the error, also supplies the required correct data.

In the case of a latch belonging to group B1, i.e. a latch liable to be affected by the error, this latch is not held by control circuit 4 during the decontamination phase. During the decontamination phase, the output of multiplexer 6 is connected to its second input, i.e. to the output of buffer register 5, except during the last cycles of the decontamination phase when buffer register 5 can supply erroneous values, i.e. during the last q−dmin cycles of the decontamination phase. The multiplexer output is then connected to its first input, i.e. to the output of the associated latch 2a. This prevents use of erroneous data which would have been entered into the buffer register during backup of the states of the latch affected by the error.

By means of an appropriate choice of the arrangement of the different backup and reconstitution circuits in the assembly of circuits considered and chaining of the operations during the decontamination phase, the associated latch 2a that is not held then supplies correct data that can be supplied by multiplexer 6 to the successor blocks, for example to logic block 1b in FIG. 2.

In an assembly where only certain well-defined blocks are liable to cause an error, a latch associated to such a block will be called source latch. An error occurring firstly in a source latch propagates, before initiation of a decontamination phase, to the successor latches at a distance smaller than or equal to q. For the source latch, a number k of states have to be saved. The state of a latch, called target latch, successor of a source latch, can be restored in various ways depending on the structure of the assembly and the position of the target latch in the assembly.

In certain cases, to restore the state of a target latch the states of one or more latches constituting immediate predecessors of the target latch have to be saved. If a latch constituting an immediate predecessor can also be affected by the error, the number of states to be saved for this immediate predecessor is given by q+1−dminc, where dminc represents the minimum distance separating the target latch from the source latch. A backup and reconstitution circuit associated to the immediate predecessor can then be used to save q+1−dminc states of this immediate predecessor. As the latter can be affected by the error, certain of the saved states are erroneous. The minimum distance separating the latch constituting the immediate predecessor from the source latch being dminp, the erroneous states of the predecessor correspond to the last q+1−dminc states of normal operation, among which q−dminp are saved. Thus, during the last q−dminp states of the decontamination phase, it is not the saved states that are used but the states generated by the latch constituting the immediate predecessor during the decontamination phase. In this way, only the correct states are used from among the saved states.

If the latch constituting the immediate predecessor is not affected by the error, then the q+1−dminc saved states are correct and are used during the decontamination phase. In this case, the circuit for backup and reconstitution of the latch constituting the immediate predecessor can be replaced by that of other predecessor latches.

In other cases, any block of the assembly can be considered as being liable to produce an error and consequently any latch of the assembly can be contaminated either by an error of which it is itself the source, or by an error produced by the associated logic circuit, or by propagation of an error produced in a predecessor block at a small distance. As each latch can be a source latch, dmin=0. If k states of a latch are saved, the last q−dmin=q saved states can be erroneous. Thus, during the decontamination phase, only the first k−q saved states will be used during the first k−q cycles of the decontamination phase. During the last q cycles of the decontamination phase, the states generated by the corresponding latch in its evolution during the decontamination phase will be used.

An example will be explained in greater detail with reference to FIG. 3. In the assembly according to FIG. 3, latch 2b is serially connected with a logic circuit 1c, a latch 2c, a logic circuit 1d and a latch 2d. The output of latch 2d is connected to the input of logic circuit 1a. We assume that all the blocks of this assembly are liable to produce an error due to a transient fault.

In such a case where any block is liable to produce errors, any latch can be affected right from the first error occurrence cycle (cycle n°0) as the error can occur on the latch itself or on the associated logic circuit. The value r must then be greater than or equal to k.

In a first alternative embodiment, an error detection circuit is associated to each block and decontamination means enabling backup and reconstitution of the states are provided to decontaminate the system. In a preferred embodiment, an error detection circuit 3 is connected to the output of each of the latches (2a, 2b, 2c and 2d) so as to detect any error occurring in the latch or the logic circuit whose output is connected to the input of the latch considered. It is also assumed that the delay necessary for the error to be detected by a detection circuit 3 is such that the error has the time to propagate to the next latch (q=1). An error is therefore liable to affect the set during 2 operating cycles.

It is also assumed that the blocks liable to be affected by an error do not have an error detection circuit. In this case, at least the states of the past k=q+1=2 cycles have to be saved. Under these conditions a backup and reconstitution circuit (5, 6), of the same type as that described with regard to FIG. 2, is associated to each latch (2a, 2b, 2c and 2d). To enable the last 2 cycles to be saved (i.e. the cycle preceding cycle n°0 and the cycle preceding cycle n°1), buffer registers each having a size r=k=2 are chosen. The decontamination phase then comprises 2 cycles. The reading function of the buffer register is activated at least during the first cycle. Its reading function can also be activated during the next cycle, but this is not compulsory. As all the latches are liable to be affected by the error, they all belong to group B1. Furthermore, each latch can be affected by an error during the last q+1−dmin cycles preceding initiation of the decontamination phase. In the particular case considered, q=1 and dmin=0 since the latch itself can be an error source. Thus q−dmin=1 and the last state saved in the buffer register will be erroneous. The output of each multiplexer 6 is connected to its second input, i.e. to the output of the corresponding buffer register 5, during the first cycle of the decontamination phase. It is on the other hand connected to its first input, i.e. to the output of the corresponding latch, during the last (q−dmin=1) cycle of the decontamination phase.

Figure 3:
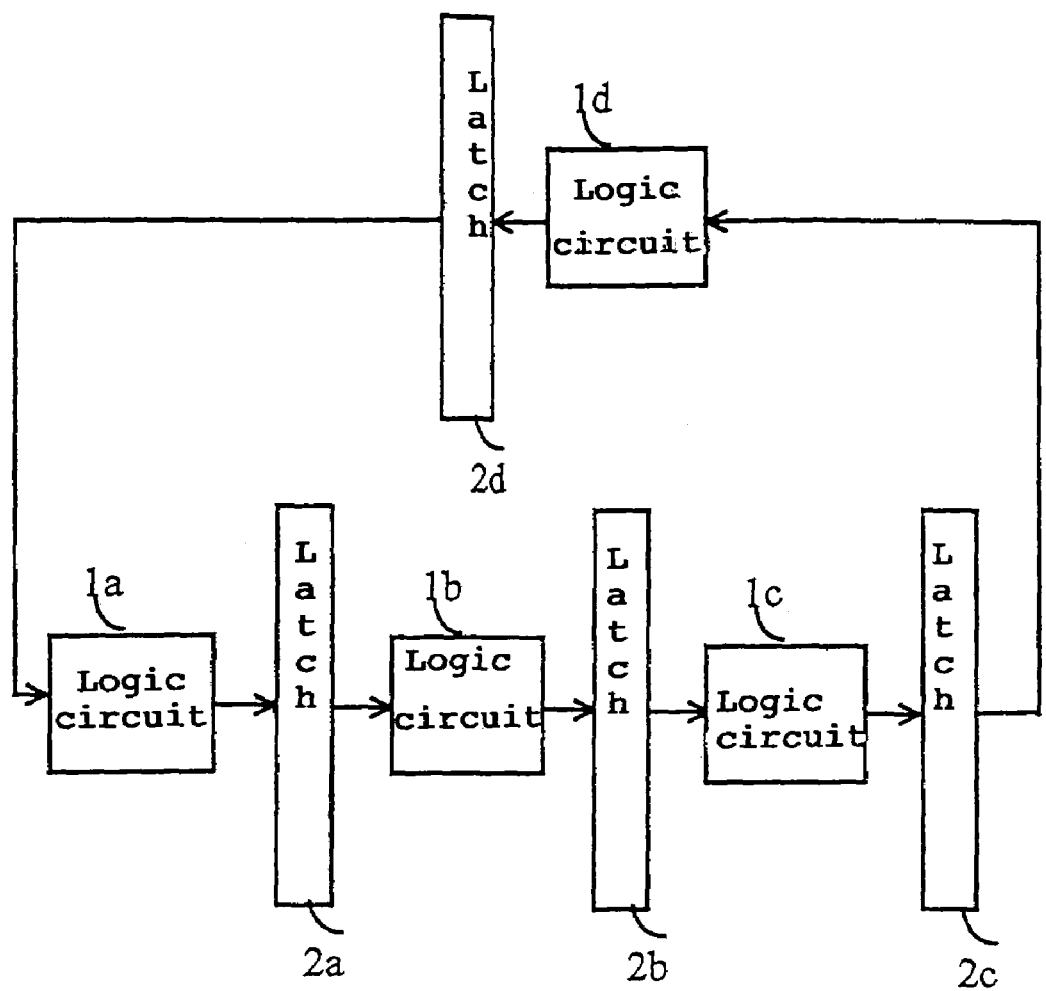
FIG. 3 represents another assembly of circuits in which the invention can be implemented.

In a second alternative embodiment, it is chosen to associate a backup and reconstitution circuit (5, 6) to a single latch of the assembly according to FIG. 3, for example to latch 2a. In this case, the number of past states having to be saved to reconstitute the state of the assembly is greater. In the assembly represented in FIG. 3, buffer register 5 associated to latch 2a will then have a size r=5 in order to be able to save the state preceding cycle n°1 (cycle n°0 whose state is erroneous) and the states of the 4 cycles preceding cycle n°0. The decontamination phase then has a duration of 5 cycles. The reading function of buffer register is activated at least during the first 4 cycles of the decontamination phase. During the next cycle, its reading function may be activated or not. This has no effect on operation of the system as the multiplexer then connects its output to its first input. Latch 2a, able to be affected by the error, is part of group B1. Moreover, since q=1, then q+1−dmin=2 and it can be affected by an error during the last two cycles preceding initiation of the decontamination phase. The output of multiplexer 6 is connected to its second input, i.e. to the output of buffer register 5 during the first 4 cycles of the decontamination phase. It is on the other hand connected to its first input, i.e. to the output of latch 2a during the last cycle (q−dmin=1, for dmin=0 since the latch itself can be an error source) of the decontamination phase.

The value k=q+1 is generally the most economical value for hardware resources.

This is not however always true as is apparent for example from the two alternative embodiments described above with reference to FIG. 3. In the first alternative embodiment, with 4 backup and reconstitution circuits (one per latch), each comprising a multiplexer and a 2-stage buffer register, the number k of saved states is equal to 2, i.e k=q+1. In the second alternative embodiment on the other hand with a single backup and reconstitution circuit comprising a multiplexer and a 5-stage buffer register, the number k of saved states, equal to 5, is greater than q+1. The hardware cost can thus be lower even though the number of states to be saved is greater. In addition, in the second alternative embodiment, by choosing the latch of the assembly having the smallest number of bits as the latch to which the backup and reconstitution circuit is associated, the size of the buffer register and of the associated multiplexer can be reduced to the minimum.

In the examples described above, the assembly does not comprise any specific error correction circuit. The number k of states to be saved is then such that $k \geq q+1$.

The invention can also be used in an assembly comprising protected blocks, i.e. blocks having error detection and correction abilities. In the prior art, in particular in assemblies comprising memories provided with error detection and correction codes, operation of the assembly is slowed down to enable an error to be corrected before it is propagated through the assembly.

According to a second aspect of the invention, the data produced by a protected block is then allowed to propagate systematically through the assembly without waiting for possible error correction. If, at a given time, an error is detected on output of a protected block, this erroneous output is corrected by the associated correction circuit and the corrected output is used in co-operation with circuits for backup and reconstitution of past states to decontaminate the blocks of the system which have in the meantime been contaminated by the error which propagated. If the error occurs at cycle n°0 and propagates during the next q cycles, resumption must be performed from cycle 0 or from any other cycle preceding it. As the error that occurred during cycle n°0 is corrected by the correction circuit associated to the protected block, resumption can be performed from cycle n°0. The number k of states to be saved can therefore be limited to $k \geq q$ and the value r to $r \geq k = q$. The case in which $k = q$ is generally the most economical in terms of hardware resources.

According to another embodiment, each state of a latch 2 is not systematically written into the associated buffer register 5, but only the states of the latch corresponding to predetermined cycles are written into the buffer register. This presents a twofold advantage:

Firstly, a judicious choice of these cycles enables the state of certain latches to be ignored, thus reducing the cost of the backup and reconstitution means. For example, the state of several internal latches of a processor may be of no use during a first instruction execution cycle. Thus, in such a case, by always choosing the first cycle of an instruction as backup cycle, it is possible to avoid the use of buffer registers and multiplexer associated to these latches.

Moreover, buffer registers 5 of small size can be used in this case. A two-stage buffer register 5 then simply has to be used for each latch 2 comprising useful states during the cycles chosen as backup cycles. For example, let us consider three successive backup cycles, C1, C2 and C3 staggered apart by several cycles, and error detection performed between backup cycles C2 and C3, s cycles after backup cycle C2, the assembly not being provided with error correction means but only with error detection means. In this case, if $s > q$, then the error occurred after cycle C2. The states saved during backup cycle C2 are then correct and can be used to reconstitute the correct state of the assembly. If on the other hand $s \leq q$, then the error occurred during or before cycle C2. The states saved in buffer register 5 during this backup cycle can then be erroneous. The states saved during backup cycle C1 then have to be used to perform decontamination. A two-stage buffer register 5 is then necessary and it is the states saved at the last-but-one backup cycle that are then used. In the case where $s > q$, each of the states saved in the buffer register can be used, the last state requiring less cycles to perform decontamination.

Using two-stage buffer registers 5 is moreover sufficient if consecutive backup cycles Ci and Ci+1 are chosen distant by at least q cycles. In this way, at the time of detection, only one stage of the buffer register can be affected by the errors.

In the case where the assembly has error correction means associated to the latches containing useful information during the backup cycles, then the buffer registers can have a single stage. In this case, even if detection takes place s cycles after the last backup cycle, with $s \leq q$, the correction means can in fact be used to correct the state saved in each buffer register. However, in this case as well, care must be taken to choose consecutive backup cycles distant by at least q cycles.

From the hardware cost point of view, it is also advantageous to reduce the number of stages of buffer register 5 from two to one in the case where the assembly is not provided with detection means.

A first approach consists in accepting a certain probability of having decontamination producing erroneous results. For example, if the distance between two backup cycles is at least 100 cycles and if errors can propagate during one cycle, the use of a single-stage buffer register does not enable decontamination to be performed correctly for errors occurring during a backup cycle. However, the probability of such an event is less than 1%, which may be acceptable in many applications. Increasing the distance separating two successive backup cycles enables this probability to be reduced in the required manner.

Another approach consists in reducing the value of q to zero. This means that an error is detected during the cycle in the course of which it occurs and that holding is performed before the error propagates from the latch in which it occurred to the latches of the successor stages and to the associated buffer register. Thus, if an error occurs during a backup cycle, it does not have time to propagate into the buffer register and the single stage of the latter contains the correct state, saved at the previous backup cycle. Of course, if the error occurs during another cycle, it does not affect the buffer register either.

Various techniques can be used to obtain $q=0$. A value of q greater than zero can be due to two factors:
  the error detection circuit delay is long and computation of the error detection signal therefore overlaps onto the next cycle following occurrence of the error,
  the error detection signal corresponding to the errors occurring in a cycle is only generated at the end of this cycle, which enables the values produced during this cycle to be checked throughout the duration thereof.

These factors only have to be eliminated during backup cycles.

Thus, to eliminate the first factor, it is possible to increase the duration of the backup cycles, i.e. to increase the clock period during these cycles. For example, if the distance between two backup cycles is greater than 10 cycles and if the duration of these backup cycles is increased by 30%, the global loss of performance is only 3%.

To eliminate the second factor, the error detection signal is produced earlier during the backup cycles than in the other cycles. The error detection signal can thus be produced within the backup cycle. Errors occurring at the end of the backup cycle can then not be detected, but this does not affect detection of errors occurring in other cycles and can be ignored.

If both these factors are present, it is possible to combine the principle of increasing the duration of the backup cycles and the principle of producing the error signal earlier in the backup cycles than in the other cycles.

In the above, we have considered that all the latches to which buffer registers are associated receive inputs at each clock cycle. However, in an assembly certain latches can be controlled by a halt signal that holds the latch when it is active. The latch therefore holds its state from the previous cycle when the halt signal is active. In other cases, the clock of a latch is derived from the system clock via a logic circuit, for example an OR gate, which receives the system clock signal and one or more logic signals on input and generates the clock ("gated clock") of the latch on output. These logic signals thus condition the latch clock which will be disabled during the cycles when these logic signals take certain values. This results in the latch holding its state from the previous cycle at each cycle during which its clock is disabled.

When the decontamination circuits are constructed, the different types of latch control signals, of halt type or other, or a clock conditioned by other logic signals (i.e. a clock of the gated clock type), must be taken into account. To do this we will proceed in the following manner:

In general, the logic signals that control a latch or condition a clock signal are generated by certain blocks of the system. Then, in the initial architecture of the system, i.e. before the decontamination circuits are inserted, the control signals of a latch and the signals conditioning its clock are considered as inputs of the latch in the same way as the signals that carry the write data in the latch. Thus, for the latches that are not held during decontamination, construction of the decontamination circuits will take account of these signals and will add the necessary circuits (as described previously) to generate the same values on these signals during the decontamination phase as in normal operation.

As far as the buffer (or FIFO) registers are concerned, in the above description, their writing function is activated at each normal operation cycle and their reading function activated during predetermined cycles of the decontamination phase. This does not however take account of the case of the control signals of the latch associated to the FIFO register nor does it take account of the case of the clock conditioning signals of this latch. These signals may disable the latch during certain cycles of the operating phase and the FIFO register has to generate the same values on its output during decontamination as its associated latch generates in normal operation. To do this, one of the following techniques can be used:

The clock conditioning signals of the associated latch are ignored and the system clock (i.e. without conditioning) is sent to the FIFO during the operating phase and during the decontamination phase. The associated latch control signals are also ignored, i.e. these signals are not used in control of the FIFO either in normal operation or during decontamination. The FIFO is therefore always in write during normal operation and in read during the predetermined cycles of the decontamination phase, as described above. Thus, if the latch is held during a normal operation cycle (by the halt signal or by its clock), it keeps its previous value. This value is supplied to the FIFO during both cycles and is stored in the consecutive stages of the FIFO which will supply it on its output during the consecutive decontamination cycles. The FIFO will thus supply the same values during decontamination as those supplied by the associated latch during normal operation.

During normal operation, the latch control signal of halt type is used to hold the FIFO at the same time as the associated latch, and the same clock is used for the FIFO as for the associated latch (i.e. of the halt type if this is the case). For operation during decontamination, two possible cases will be considered. In the case where the halt control signal of the associated latch and the clock conditioning signals of this latch take the same values during decontamination as in normal operation, the same halt signal and the same clock signal will also be used during decontamination for the FIFO. In the case where the halt control signal of the associated latch or the clock conditioning signals of this latch do not take the same values during decontamination and in normal operation (which can arise if these signals are not generated in the system or in the case where the latches of the stages generating these signals are not enabled during decontamination), a FIFO will then be used to save these signals during normal operation and to supply them to the system during the decontamination phase, by means of a multiplexer, as described above for other signals of the system. This FIFO will have the same number of stages and will be enabled during the same normal operation and decontamination cycles as the FIFO to which the halt signal and clock conditioning signals are to be sent.

The invention claimed is:

1. Assembly of electronic circuits comprising a plurality of blocks connected to one another, means for detecting errors in the data supplied by at least one of the blocks, and decontamination means, set wherein the decontamination means comprise at least one circuit for backup and reconstitution of the past states of a latch associated to a block of the assembly, the backup and reconstitution circuit comprising a multiplexer and a buffer register of the first-in first-out type, the multiplexer comprising a first input connected directly to the output of the latch and a second input connected to said output by means of said buffer register.

2. Assembly according to claim 1, wherein, a block being associated to an error correction circuit and the error being able to propagate during q cycles before detection and initiation of a decontamination phase, the buffer register of a backup and reconstitution circuit of a latch associated to said block comprises a number of stages enabling a number of states greater than or equal to q to be saved.

3. Assembly according to claim 1, wherein, a block being associated to an error detection circuit and the error being able to propagate during q cycles before detection and initiation of a decontamination phase, the buffer register of a backup and reconstitution circuit of a latch associated to said block comprises a number of stages enabling a number of states greater than or equal to q+1 to be saved.

4. Assembly according to claim 1, comprising control means to control the buffer register and the multiplexer during a normal operating phase and during a decontamination phase, following detection of an error, so as to:
  activate the buffer register writing function during predetermined backup cycles during the normal operating phase,
  connect the output of the multiplexer to its first input at each cycle during the normal operating phase, and
  activate the buffer register reading function and connect the output of the multiplexer to its second input during predetermined cycles of the decontamination phase.

5. Assembly according to claim 4, wherein the decontamination phase begins by said predetermined cycles of the decontamination phase.

6. Assembly according to claim 4, wherein two consecutive backup cycles are separated by at lease q cycles.

7. Assembly according to claim 6, wherein the buffer register comprises two stages.

8. Assembly according to claim 6, wherein the buffer register comprises a single stage.

9. Assembly according to claim 8, wherein two successive backup cycles are separated by at least 10 cycles.

10. Assembly according to claim 8, wherein the error signal generated in response to the states of a backup cycle is produced before the end of the backup cycle.

11. Assembly according to claim 10, wherein the duration of a backup cycle is greater than the duration of the other cycles.

12. Assembly according to claim 8, wherein the error signal generated in response to the states of a backup cycles is produced earlier than the error signals generated in response to the states of the other cycles.

13. Assembly according to claim 4, wherein, the backup and reconstitution circuit being associated to a latch of the assembly that is not liable to be contaminated by the error, said predetermined cycles of the decontamination phase are hold cycles, that are followed by unhold cycles, the control device comprising means for holding the latch during the hold cycles and for enabling the latch during the unhold cycles.

14. Assembly according to claim 13, wherein the control device comprises means for holding the latch throughout the decontamination phase, all the cycles of the decontamination phase being hold cycles.

15. Assembly according to claim 4, wherein, the backup and reconstitution circuit being associated to a latch of the assembly that is liable to be contaminated by the error, the control circuit connects the output of the multiplexer to its first input after said predetermined cycles of the decontamination phase.

16. Assembly according to claim 1, wherein each block of the assembly being liable to be affected by an error, a backup and reconstitution circuit is associated to each of the latches associated to predetermined blocks of the assembly.

17. Assembly according to claim 16, wherein a backup and reconstitution circuit is associated to each of the latches of the assembly.

* * * * *